W. PHILIP.
SAFETY DEVICE FOR REVERSIBLE WINDING OR HAULING PLANTS.
APPLICATION FILED AUG. 30, 1909.
999,520.
Patented Aug. 1, 1911.
3 SHEETS—SHEET 1.
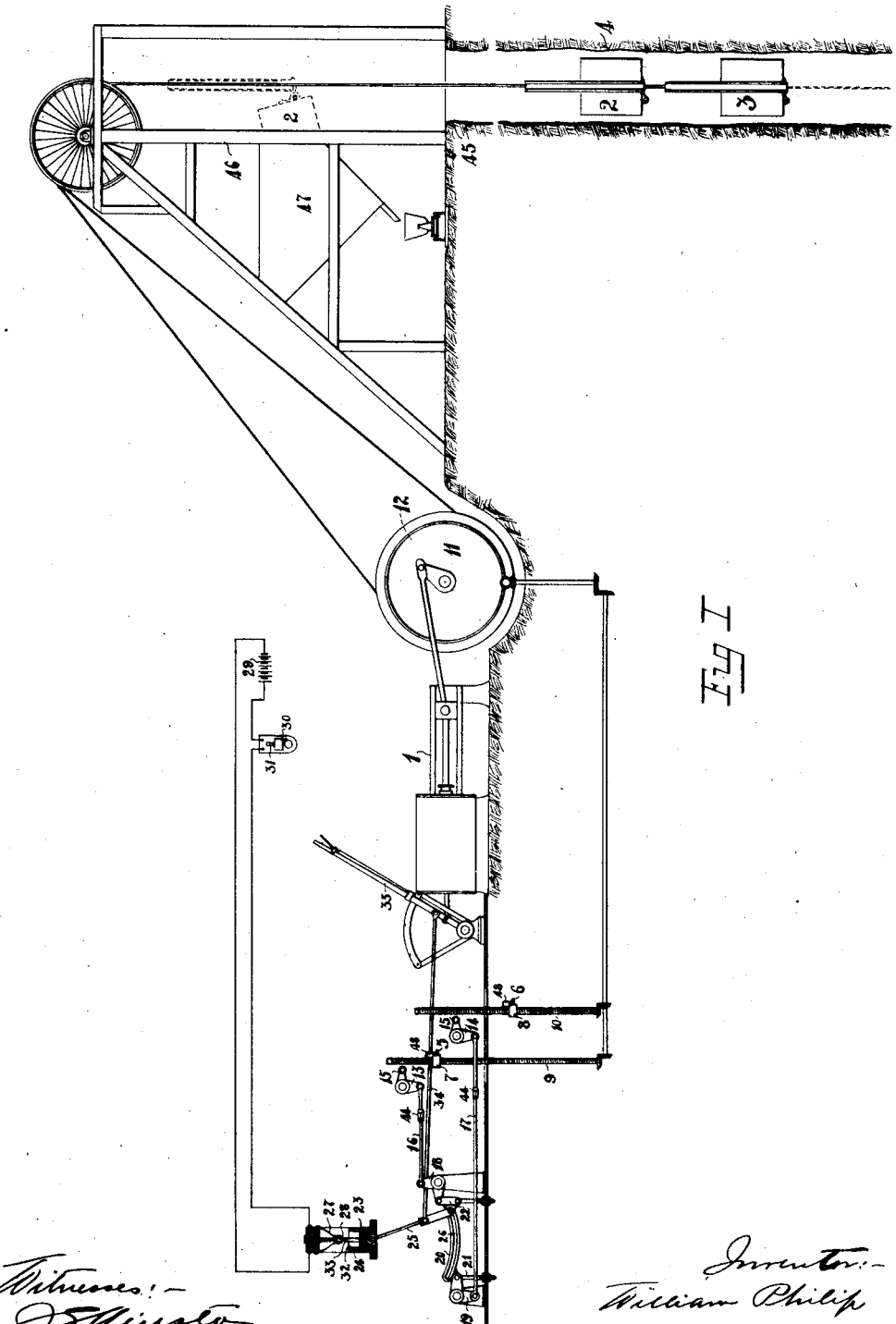

W. PHILIP.
SAFETY DEVICE FOR REVERSIBLE WINDING OR HAULING PLANTS.
APPLICATION FILED AUG. 30, 1909.
999,520.
Patented Aug. 1, 1911.
3 SHEETS—SHEET 2.
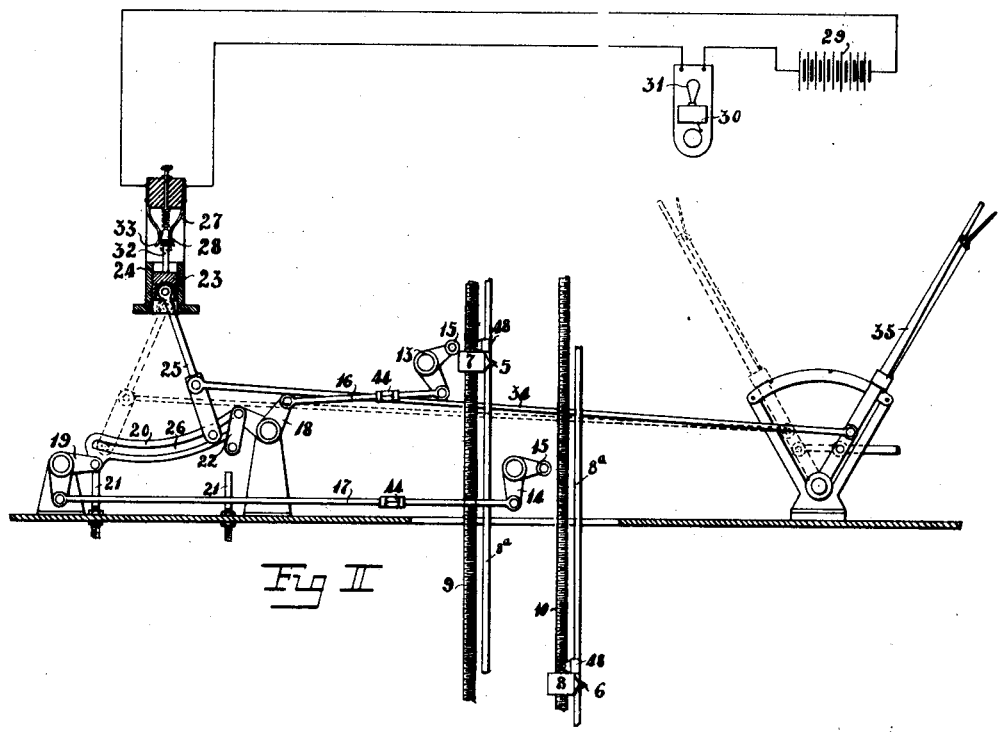
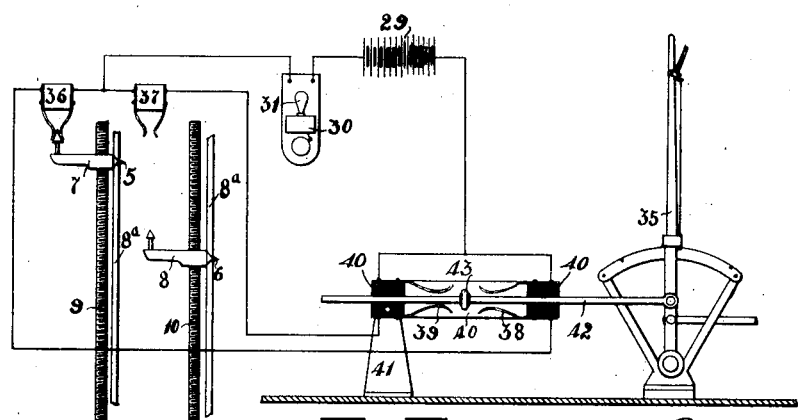

W. PHILIP.
SAFETY DEVICE FOR REVERSIBLE WINDING OR HAULING PLANTS.
APPLICATION FILED AUG. 30, 1909.
999,520.
Patented Aug. 1, 1911.
3 SHEETS—SHEET 3.
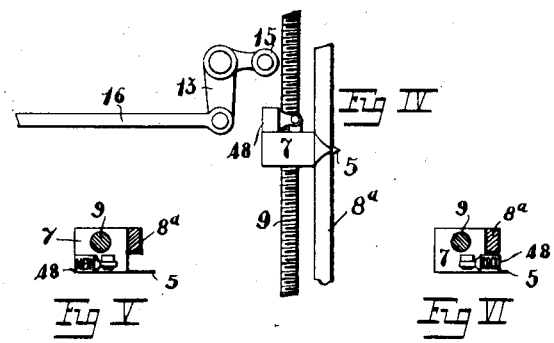
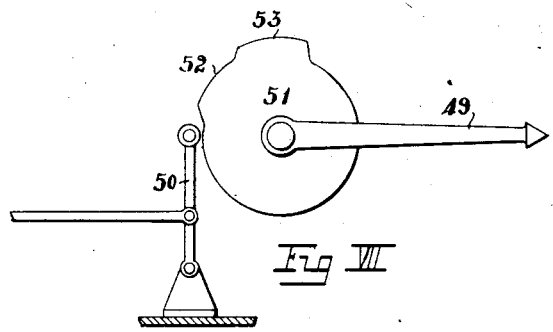
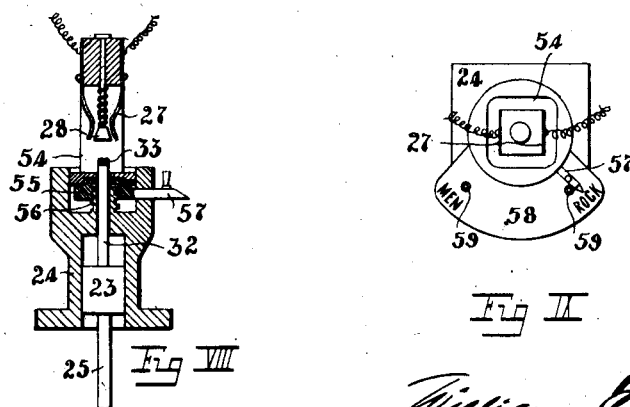

UNITED STATES PATENT OFFICE.

WILLIAM PHILIP, OF GERMISTON, TRANSVAAL.

SAFETY DEVICE FOR REVERSIBLE WINDING OR HAULING PLANTS.

999,520.  Specification of Letters Patent.  Patented Aug. 1, 1911.

Application filed August 30, 1909. Serial No. 515,327.

*To all whom it may concern:*

Be it known that I, WILLIAM PHILIP, foreman fitter, a British subject, residing at the Simmer & Jack East Limited, Germiston, Transvaal, have invented new and useful Improvements in Safety Devices for Reversible Winding or Hauling Plants, of which the following is a specification.

The present invention relates to winding or hauling plants, whether operated by steam, electric power or otherwise, in connection with which the driver is required to reverse the direction of movement at the termination of each trip.

It sometimes happens that after stopping the engine the driver omits to perform the reversing operation; with the result that on the next trip the cage or skip is started in the wrong direction, leading not infrequently to loss of life.

It is the purpose of the present invention to afford the driver a clear audible, visual or like indication when the reversing mechanism is dangerously positioned. To this end there is employed a part or parts moving positively with the winding drum or with the skip or cage, as the case may be, such that when said part reaches a predetermined position,—*e. g.*, that corresponding to the end of a trip,—it tends to actuate the signal. The actuation of the signal however is controlled by some suitable element of the reversing gear having a defined and positive motion, whereby the signaling mechanism is rendered operative when the reversing gear is in the dangerous position with reference to that of the skip for the time being, but otherwise is rendered inoperative.

In the accompanying drawings, Figure I shows more or less diagrammatically a winding plant fitted with one form of the invention, the signal being out of operation. Fig. II is an enlarged partial view showing the signal in action, Fig. III illustrates an alternative construction for carrying out the invention, Fig. IV is an enlarged detail view of Fig. I, showing a device for varying the signaling point, Fig. V is a plan of Fig. IV, Fig. VI is a similar view with the position of a part changed, and Figs. VII—IX illustrate an alternative device for varying the signaling point, Fig. IX being a plan of Fig. VIII.

Referring to Figs. I and II, 1 indicates a winding engine operating a pair of skips or the like 2 and 3 simultaneously in opposite directions in the shaft 4. Numerals 5 and 6 indicate the pointers for said skips 2 and 3 respectively, in a well known form of skip indicating device. In such device the pointers 5 and 6 are attached respectively to nuts or travelers 7 and 8 which are prevented from turning in any suitable manner and travel upon screw-threaded rods 9, 10, adapted to be rotated by movement of the rope drums 11, 12, actuating the skips; that is nut 7 moves with skip 2 and nut 8 with skip 3. In the example shown, said nuts or travelers are employed to operate the motion transmitting means for actuating the signaling means; but where it is considered undesirable to impose such additional function upon the indicating device, any other convenient mechanism having equivalent parts moving with the skips may be employed for the purpose.

It will be understood that by the term signaling means I do not necessarily limit myself to an electric bell or an electric light located in a circuit having a battery, although such a construction is the simplest means immediately apparent, and by the term signaling means, therefore, in so far as the drawings are concerned I refer not to the bell or light alone, but to the electric circuit having terminal points adapted to be closed by suitable means actuated by the operating or driving means for the plant. It will also be understood that the travelers 7 and 8 are prevented from turning with the threaded rods in any well known way, for instance in Figs. III, IV, V and VI there is illustrated a vertical guide bar 8ª having a flat face resting against the squared end of the traveler, behind the indicator points 5 and 6, the position of this flat bar being more clearly shown in Figs. V and VI.

In operative relation with the nuts or travelers are pivoted tappets 13 and 14, each provided at the end with an anti-friction roller 15. The tappets are so disposed as to be lifted by their nuts or travelers when the latter approach the position indicative of the corresponding skip being at the landing stage, tip or other selected limiting point of its trip; and so also that should either nut or traveler continue to move after having so lifted the tappet, the roller 15 of the latter will run along the side of the nut or traveler, thereby avoiding straining or displacement of the parts. Said tappets 13 and 14 are severally connected, as by rods 16 and 17, to a pair of bell cranks 18 and 19 each connected to one end of an arcuate floating link 20 which may normally rest upon adjustable posts 21. The methods of connection between the tappets 13 and 14 and the link 20,—as will be understood from the drawings,—is such that lifting of either tappet raises its corresponding end of the link. A short idle link 22 is inserted between one bell crank, say 18, and the floating link 20, to compensate for the angularity of the motion of the bell crank arms.

Centrally above the floating link 20, a cross head 23 is arranged to slide in a vertical guide 24. To said cross head is pivoted one end of a radius rod 25 the other end of which engages with a slot 26 formed in link 20. Said slot 26 is arcuate to the upper pivot of the radius rod, so that when the link 20 is lying horizontally the radius rod may be swung from side to side of the slot 26 without moving the cross head 23.

Above the cross head is arranged an electric contact device consisting of the two spring terminals 27 which may be connected by forcing the spring controlled plug 28 between them. A contact of this form is preferred owing to the rubbing action which keeps the contacting surfaces bright. The terminals 27 are arranged in circuit with a source of current 29 and with a signaling means such as the bell 30 and lamp 31; a finger 32 having an insulated top 33 is carried by the cross head 23 and forces in plug 28 to close the circuit when the cross head is raised.

The radius rod 25 is connected by a rod 34 to the reversing lever 35 of the winding engine, so as to move therewith; and so also that upon either skip coming to the surface and the reversing gear remaining in position to continue said skip's upward motion, the radius rod will be at that end of link 20 which is lifted in consequence of such arrival of the skip. Thus in Fig. I, lever 35 is so positioned that the engine is raising skip 2 corresponding to traveler 7 and the radius rod 25 is consequently over at the right hand end of link 20. When, as indicated by dotted lines in Fig. I, the rising skip 2 has arrived at the surface, the mechanism takes up the position of Fig. II, i. e., nut 7 operates to lift the right hand end of link 20 and with it the radius rod 25 whereby the signal is actuated and the driver warned. The signal continues in operation until,—as illustrated by dotted lines, Fig. II,—lever 35 is reversed and rod 25 is carried with it to the unraised left hand end of link 20, thereby breaking the signal circuit. When on the next trip skip 3 comes to the surface the signal will again be actuated, this time by means of traveler 8, until the lever 35 and rod 25 are restored to their original position. When neither skip is at the surface, and consequently link 20 is horizontal, reversal of the engine may be effected freely without actuating the signal; and similarly no signal will be made upon the arrival of a skip, in the event of the engine having been previously reversed to retard the skip's motion, since the reversing gear will not then be in a dangerous position.

In the arrangement illustrated in Fig. III, the nuts 7 and 8 operate electric contacts 36 and 37 respectively, in the signal circuit. Also in circuit with said contacts 36 and 37 are the contacts 38 and 39 secured to an insulating frame 40 pivoted to a support 41. A rod 42 pivoted to the reversing lever 35 passes through and helps to support said frame 40, and carries an insulated metal boss 43 which on movement of lever 35 to one extreme or the other joins the contacts 38 or 39 as the case may be. This arrangement operates similarly to that already described, that is to say, when the reversing gear is dangerously positioned, at the end of a trip, contacts 36 and 38, or 37 and 39 coöperate to cause the actuation of the signal.

Means may be provided for varying the point or points at which the signal is or may be brought into operation. Thus, adjustment of a more or less permanent nature may be secured by severing the rods 16 and 17 (Figs. I and II), and interposing turnbuckles 44 by which such rods may be varied in length in order to bring the tappets 13 and 14 nearer to or farther from their respective nuts. The conditions under which some winding plants are worked, call for a simpler and more rapid adjustment. For instance, men may require to be landed at the collar 45 of the shaft 4, while rock is hoisted up into the head gear 46 to be tipped into bins 47. An adjustment suitable for these conditions is shown in Figs. I and II and to an enlarged scale in Figs. IV–VI. Each indicator nut or traveler 7, 8, is fitted with a hinged block 48, which may be turned over to lie on top of the nut in the path of the corresponding tappets 13, 14, or thrown back out of the way. The two faces of the block 48 may carry indicia denoting different conditions of winding. Thus, as seen in Fig. V, the face uppermost when the block is turned into the path of the tappet, may be inscribed with the word "Men;" and such turning in of the block causes the signal to be given appropriately for stopping the cage at the collar. On the other side of the block may be the word "Rock" (Fig. VI), and when the block is so positioned as to show this word, the signal will be adjusted for winding up to the tip. Figs. VII to IX illustrate a similar adjustment adapted for use with an indicator having a dial around which the pointer 49 revolves. In this case, the tappet 50 for actuating the signal is moved by a cam plate 51 having the two cam steps 52 and 53 (Fig. VII).

Referring to Figs. VIII and IX, the cross head 23 and finger 32 are similar to those of Fig. I. The contact terminals 27 and the spring plug 28 are fixed upon a carrier 54, so mounted upon the cross head guide 24 as to be adjustable vertically thereto. Said carrier 54 is supported by a nut 55 working upon a post 56 screwed with a quick thread. From the nut projects a handle 57 by which it may be rotated through an arc to lower or raise the contact device with respect to the finger 32 and so cause the signal to be actuated by either cam step 52 or 53 as required. The handle 57 may move over a plate 58 carrying indicating words and provided with detent devices 59 for holding the handle in either extreme position.

It will be evident from the foregoing description that the invention may be embodied in a great variety of forms according to the kind of winding or hauling plant to which it is to be applied. It will also be understood that although for convenience the signal has been described as coming into operation upon the skip or cage nearing the surface, it may equally well be brought into operation upon the attainment of any other point at which reversal of the engine is requisite. It may here be remarked that in addition to its primary function of safeguarding the next future trip, the invention operates incidentally as a warning against over-winding during the current trip.

It has already been proposed to provide a hoisting engine with an automatically closing throttle valve capable of being opened by the reversing lever through intermediate mechanism. Said intermediate mechanism is actuated by equivalents of the tappets 13 and 14, and operates upon the skip reaching a terminal point of its trip to break connection between the lever and the valve, thereby permitting the latter to close automatically. The intermediate mechanism so moves that connection between the lever and the valve can only be restored by reversing the lever. Such proposed apparatus is thought to be open to serious objection. It is frequently necessary for the driver, after having once shut off steam or reversed the engine in order to check the skip when nearing the surface, to again give the engine steam once or twice to insure the skip reaching its destination. Again when working a pair of skips and changing loading stations, one skip may be kept stationary at its terminal station, while the other is moved up or down as the case may require. It is also customary in some collieries to land the cage upon chairs so that the corves may be run into or from it; and before starting the cage downward, it is necessary first to lift it slightly to permit the chairs to be withdrawn. To enable these operations to be carried out with the former apparatus, it would be necessary to employ a by-pass steam valve, which would in effect cut out the automatic throttle valve. This, however, would add a factor of uncertainty and complexity in the control of the winding engine at the most critical time; a condition of affairs to be sedulously avoided. Perhaps the most serious objection however, is that by purporting to insure the safety of the skip by automatic means, the device tends to lessen the vigilance of the driver and thereby actually work more harm than good. The present invention, on the other hand, while leaving the entire control of the skip to the driver, stimulates the exercise of his vigilance when the same is most needed.

It is especially to be noted that the present invention differs functionally from the prior device. In the latter, external interference with the engine control is introduced, leading as shown above, to intricacy of working and complication of parts. On the other hand, the present invention calls for no variation whatever in the winding mechanism or method of operating it; but the usual reversing gear is given control over the accomplishment of the function of apparatus entirely distinct from the winding mechanism itself.

What I claim, and desire to secure by Letters Patent is:—

1. In a winding or hauling plant, the combination of a skip or the like, operating means therefor, a reversing lever, signaling means, signal controlling means consisting of a movable member, connecting means between said controlling means and said reversing lever, and means actuated by said operating means and tending to actuate said signaling means through said controlling means, substantially as described.

2. In a winding or hauling plant, the combination of a skip or the like, operating means therefor, reversing mechanism, signaling means, signal controlling means adapted to be positioned to set said signaling means for actuation upon the skip arriving in the vicinity of the terminal point of a given trip and to remain so positioned until the reversing mechanism is shifted, connecting means between said controlling means and reversing mechanism, and means actuated by said operating means tending to actuate said signaling means through said controlling means, substantially as described.

3. In a winding or hauling plant, the combination of a skip or the like, operating means therefor, reversing mechanism, signaling means, motion transmitting means including as an element signal controlling means, adapted to be operated upon the skip reaching a predetermined position to actuate said signaling means, and means connecting said reversing mechanism with said controlling means for setting said motion transmitting means in proper operative position, substantially as described.

4. In a winding or hauling plant, the combination of a skip or the like, operating means therefor, reversing mechanism, signaling means, motion transmitting means, including as an element signal controlling means, means actuated by said operating means coöperating with said motion transmitting means for rendering a signal at a predetermined time in one direction of movement of said operating means, and means connecting said reversing mechanism with said signal controlling means for shifting the latter to interrupt a signal and reset the motion transmitting means for actuation at a predetermined time in a reverse direction of movement of said operating means, substantially as described.

5. In a winding or hauling plant, the combination of a skip or the like, operating means therefor, reversing mechanism, signaling means, a curved link, means for movably supporting the ends of said link, means actuating said supporting means at a predetermined position of said skip's travel, signal controlling means, comprising as an element a radius rod at one end slidingly engaging said curved link, and means connecting said reversing mechanism with said radius rod for shifting said rod along said link, substantially as described.

6. In a winding or hauling plant, the combination of a skip or the like, operating means therefor, reversing mechanism, signaling means, a slotted link, signal controlling means, comprising as an element a radius rod provided at one end with means associated with said signaling means and at its other end engaging within the slot of said link, means tiltingly supporting the ends of said link, means actuating said tiltingly supporting means by the movement of said operating means at predetermined times, and means connecting said reversing mechanism with said radius rod for shifting the end of said rod along said slot, substantially as described.

7. In a winding or hauling plant, the combination of a skip or the like, operating means therefor, reversing mechanism, electric signaling means, a slotted link, signal controlling means, comprising as an element a radius rod at one end supporting an electrical circuit controlling member associated with the circuit of said signaling means, and at its other end engaging within the slot of said link, means tiltingly supporting the ends of said link, means actuating said tiltingly supporting means by the movement of said operating means at predetermined times, and means connecting said reversing mechanism with said radius rod for shifting the end of said rod along said slot, substantially as described.

8. In a winding or hauling plant, the combination of a skip or the like, operating means therefor, reversing mechanism, a pair of levers, a curved link pivotally supported at its ends by the free ends of said levers, signal controlling means comprising as an element a radius rod operatively associated at one end with said signaling means and at its other end slidingly engaging said curved link, means for automatically rocking said levers at predetermined times in the movement of said skip, and means connecting said reversing mechanism with said radius rod for shifting same along said link and setting said signal controlling means in position to be actuated upon the movement of the respective ends of said link, substantially as described.

9. In a winding or hauling plant, the combination of a skip or the like, operating means therefor, reversing mechanism, signaling means, motion transmitting means for controlling the signaling means and connected with the reversing mechanism, travelers moving with said operating means and arranged to contact with and operate said motion transmitting means at predetermined times, and means for varying the time of operating said motion transmitting means by said travelers, substantially as described.

10. In a winding or hauling plant, the combination of a skip or the like, operating means therefor, reversing mechanism, signaling means, motion transmitting means for controlling the signaling means and connected with the reversing mechanism, travelers moving with said operating means and arranged to contact with and operate said motion transmitting means at predetermined times, and means for varying the time of contact between said motion transmitting means and said travelers, comprising a part carried by said travelers and independently movable thereon to adjust its position relatively to said motion transmitting means, substantially as described.

In testimony whereof I have signed my name to this specification in the presence of two subscribing witnesses.

WILLIAM PHILIP.

Witnesses:
ALFRED L. SPOOR,
WESLEY A. JOHN.